United States Patent [19]

Finocchio et al.

[11] Patent Number: 5,465,200

[45] Date of Patent: Nov. 7, 1995

[54] LAMP ASSEMBLY FASTENING SYSTEM

[75] Inventors: Anthony J. Finocchio, Mt. Clemens; Edward M. Finan, Bingham Farms, both of Mich.

[73] Assignee: General Motors Corporation, Detroit, Mich.

[21] Appl. No.: 93,340

[22] Filed: Jul. 19, 1993

[51] Int. Cl.⁶ ............................... F21Y 21/00; B60Q 3/02
[52] U.S. Cl. ............................... 362/368; 362/74
[58] Field of Search .......................... 362/74, 368, 382, 362/457

[56] References Cited

U.S. PATENT DOCUMENTS

| | | | |
|---|---|---|---|
| 3,505,168 | 2/1967 | Ramniceanu | 362/74 |
| 3,514,010 | 5/1970 | Rossi | 362/74 |
| 4,745,534 | 5/1988 | Bronner | 362/368 |
| 4,819,134 | 4/1989 | Rossi | 362/74 |
| 5,239,449 | 8/1993 | Wusk et al. | 362/74 |
| 5,329,429 | 7/1994 | Mathias et al. | 362/74 |

Primary Examiner—Richard R. Cole
Attorney, Agent, or Firm—William A. Schuetz

[57] ABSTRACT

A fastening system for fixedly connecting a lamp assembly to a support panel provided with a pair of retainer openings and in which the lamp assembly is provided with a pair of tiltable mounting studs which are insertable into the retainer openings, and the retainer openings are designed so that a portion of the support panel adjacent each of the openings is engaged by and cause tilting of the mounting studs before the latter can gain access into the associated retainer opening for locking the lamp assembly to the support panel.

7 Claims, 1 Drawing Sheet

LAMP ASSEMBLY FASTENING SYSTEM

This invention concerns fastenings systems and more particularly relates to a fastening system for attaching a lamp assembly to a support panel.

BACKGROUND OF THE INVENTION

Fastening systems designed to attach dome, reading and other forms of lamp assemblies on many vehicles require the use of separate fasteners and a large number of hand operations to accomplish the installation. In order to simplify and expedite the mounting and fastening of a lamp assembly to a support panel during the manufacture of an automobile, we propose having the fastener portion be an integral part of the lamp assembly so that the latter can be connected to the support panel by one simple hand operation after making the wiring connection.

SUMMARY OF THE INVENTION

More specifically, the present invention is intended to be used with a support panel which forms a part of the main body structure of a vehicle and has a pair of spaced retainer openings formed therein that serve as attaching points for a lamp assembly. In the preferred form of the invention, the lamp assembly is provided with a base member which is designed to be releasably connected to a lens cover and supports the usual lamp bulb and socket provided in such lamp assemblies. First and a second cantilevered members are formed with the base member and each of the cantilevered members is connected to the base member by a resilient hinge. First and second stud members are respectively mounted on the first and second cantilevered members and are adapted to be received by the retainer openings provided in the support panel. Each of the stud members is formed with a plurality of ratchet teeth along its length so as to present a saw-tooth profile when viewed in elevation. In addition, each of the first and second stud members are located in a position on the respective first and second cantilevered members so that the tapered sides of the ratchet teeth engage a portion of the base member adjacent each of the retainer openings when the stud members are being inserted into retainer openings. This engagement causes the cantilevered members to pivot away from the afore-mentioned portion about the associated resilient hinge to permit the stud members to be ratcheted into the retainer openings and locked in position for maintaining the lamp assembly in a fixed position relative to the support panel.

The objects of the present invention are to provide a new and improved lamp assembly which can be quickly fastened to a support panel without the use of any tools and is characterized in that the base member of the lamp assembly is provided with a pair cantilevered spaced tabs each of which carries a stud member having an outer configuration that allows the two stud members to be inserted into accommodating openings located in the support panel and ratcheted into a locked position relative to the support panel; to provide a new and improved base member for a lamp assembly that is attachable to a support panel and includes a pair of stud members supported by a pair of cantilevered tab members formed with the base member and which allow the stud members to pivot bodily so they can be inserted into a pair of retainer openings formed in the support panel having their centers spaced a distance greater than the distance between the longitudinal centers of the stud members; to provide a new and improved fastening system for fixedly connecting a lamp assembly to a support panel provided with a pair of retainer openings and in which the lamp assembly is provided with a pair of tiltable mounting studs which are insertable into the retainer openings and the retainer openings are designed and located so that a portion of the support panel adjacent each of the openings is engaged by and cause tilting of the studs before the latter can gain access into the associated retainer opening for locking the lamp assembly to the support panel; and to provide a new and improved fastening system for a lamp assembly provided with a base member having a pair of stud members supported on cantilevered tab members formed with the base member and having the body portion of each of the stud members formed along its length with a series of frusto-conical sections made of a rigid material and adapted to function as ratchets when inserted into a pair of retainer openings formed in a support panel for maintaining the lamp assembly in a locked position relative to the support panel.

BRIEF DESCRIPTION OF THE DRAWINGS

Other objects and advantages of the present invention will be apparent from the following detailed description when taken with the drawing in which.

DETAILED DESCRIPTION OF THE INVENTION

Figure 1:
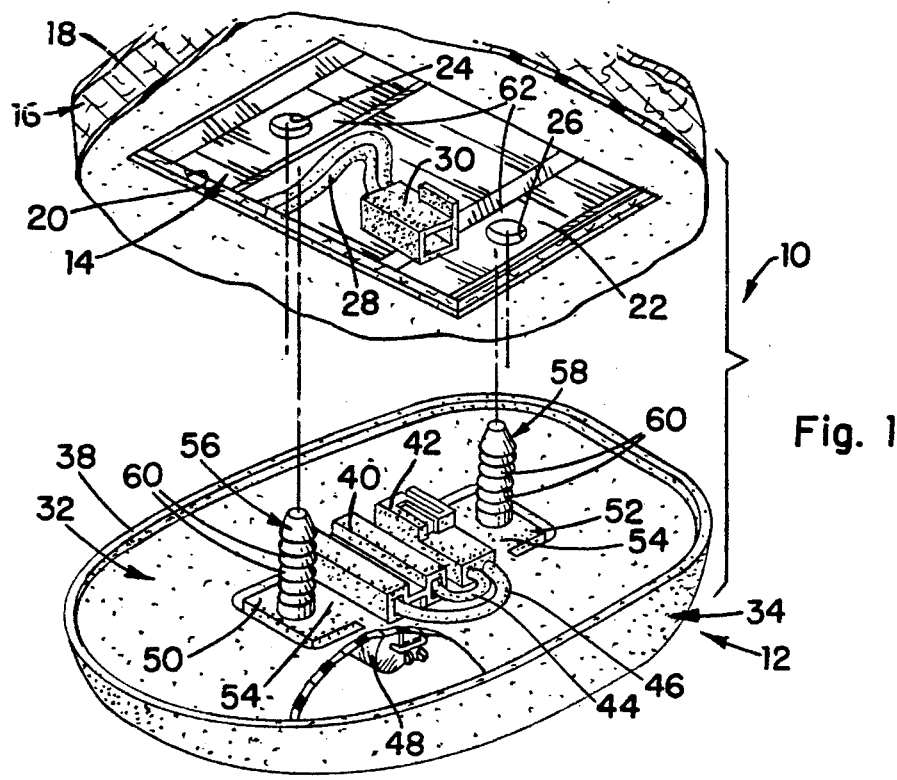
FIG. 1 is a perspective view of a fastening system made in accordance with the present invention for securing a lamp assembly to a support panel of a motor vehicle.

Referring to the drawing and more particularly to FIG. 1 thereof, a fastening system 10 according to the present invention is shown that is employed for securing a dome lamp assembly 12 to a bow member 14 which together with a roof liner 16 is fixed to the sheet metal roof 18 of a motor vehicle. A generally rectangular opening 20 is formed in the roof liner 16 so as to expose a support panel portion 22 of the bow member 14 to which the lamp assembly 12 is to be secured. The exposed portion 22 of the bow member 14 is provided with a pair of circular retainer openings 24 and 26 and, as is conventional, a wire harness 28 terminating with an electrical receptacle or connector 30 extends out of the roof liner opening 20 for connection with the lamp assembly 12.

In this regard, the lamp assembly 12 includes a base member 32 which releasably carries a lamp cover 34 provided with a lens 36. The lamp cover 34 has a peripheral edge 38 which surrounds the base member 32 and is intended to completely cover the opening 20 in the roof liner 16 when the lamp assembly 12 is mounted to the bow member 14. In this instance, the base member 32 is made of a plastic material of uniform thickness and is generally planar in configuration. The upper surface of the base member 32 is provided with the usual electrical connectors 40 and 42 which, through appropriate insulated wires 44 and 46, feed electrical current to a light bulb 48 which provides light for dispersion by the lens 36 within the passenger compartment of the vehicle. Although not shown, the lower surface of the lamp assembly can be provided with additional bulbs which serve as reading lamps operated by appropriate hand-operated switches mounted on the lamp cover 34 for selectively activating the reading lamps.

More specifically, the base member 32 is formed with a pair of identical cantilevered tab members 50 and 52 located on the opposite sides of the electrical connectors 40 and 42 carried by the base member 32. Each of the tab members 50 and 52 is integrally connected with the body of the base member by a resilient hinge 54 which, as will be more fully explained hereinafter, allows the associated tab member to pivot out of the plane of the base member 32.

Figure 2:
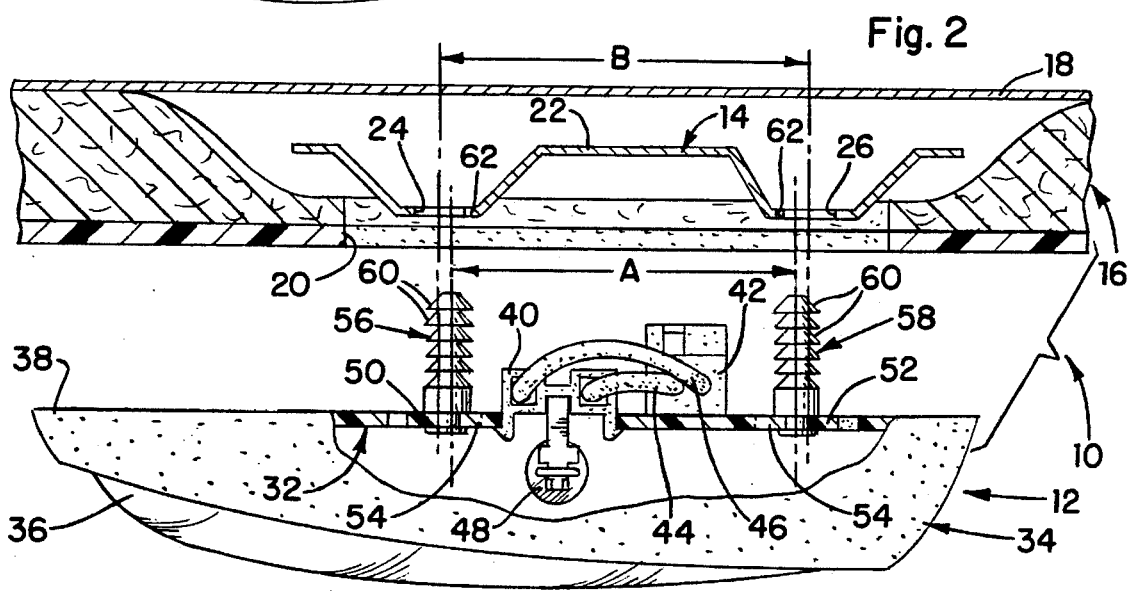
FIG. 2 is an enlarged cross-sectional elevational view of the lamp assembly and support panel of FIG. 1 with parts broken away showing the relative positions of a pair of mounting stud members formed with the lamp assembly and a pair of retainer openings in the support panel prior to the lamp assembly being installed to the support panel.

As best seen in FIG. 2, a pair of mounting stud members 56 and 58 have their lower ends fixedly fastened to the tab members 50 and 52, respectively. The stud members 56 and 58 are made from a metallic material such as aluminum and are identical in size and configuration. Each of the stud members 56 and 58 is formed with a plurality of identical frusto-conical sections starting at a predetermined distance from the upper surface of the base member 32. The tapered surface 60 of each of the frusto-conical sections is inclined towards the base member 32 and has a sharp return towards the center of the associated study member so as to provide a saw-tooth type profile when viewed in elevation.

As mentioned hereinbefore, FIG. 2 shows the relative positions of the stud members 56 and 58 of the base member 32 and the retainer openings 24 and 26 of the bow member 14 prior to the lamp assembly 12 being connected to the bow member 14. It will be noted that each of the two stud members 56 and 58 is supported by the associated tab member so that the longitudinal center axis of each stud member is perpendicular to the plane of the base member. Moreover, the distance "A" between the longitudinal center axes of the stud members 56 and 58 is less than the distance "B" which is the horizontal distance between the centers of the circular retainer openings 24 and 26. Also, it will be noted that the diameter of each of the retainer openings 24 and 26 is slightly larger than the major diameter of the frusto-conical sections of the stud members 56 and 58.

Figure 3:
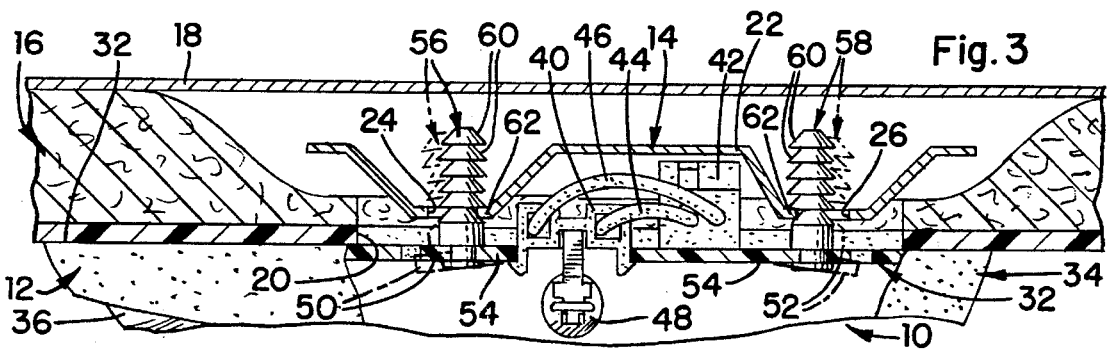
FIG. 3 is a view similar to that seen in FIG. 2 but shows in phantom lines the positions assumed by the mounting stud members during insertion thereof into the retainer openings and shows in full lines the positions of the mounting stud members when the lamp assembly is in a fully installed position relative to the support panel.

Thus, it should be apparent from the above description that when the lamp assembly 12 is positioned relative to the bow member 14, as seen in FIG. 2, and the lamp assembly 12 is raised to insert the stud members 56 and 58 into the retainer openings 24 and 26, the sides of the tapered surfaces 60 facing the connectors 40 and 42 will initially contact a portion 62 of the bow member adjacent each opening 24 and 26 and prevent further insertion movement of the stud members 56 and 58. However, inasmuch as the stud members 56 and 58 are carried by the cantilevered tab members 50 and 52, the insertion force being exerted on the lamp assembly 12 will cause the stud members 56 and 58 to tilt outwardly and the tab members 50 and 52 to pivot downwards to the phantom line positions seen in FIG. 3. This tilting movement of the stud members 56 and 58 and pivoting of the tab members 50 and 52 will be repeated as the series of frusto-conical sections pass successively by the portion 62 of the support panel portion 22 adjacent the associated retainer opening. As a result, the stud members 56 and 58 are ratcheted upwardly into the accommodating retainer openings 24 and 26 peripheral edge 38 of the lamp assembly 12 makes contact with the trim panel 16 as seen in FIG. 3. In the full line position of FIG. 3, the lamp assembly 12 will be locked to the bow member 14 by having the tab member 50 directing a clockwise force about its hinge 54 to the stud member 56 and the tab member 52 directing a counter-clockwise force about its hinge 54 to the stud member 58. The net effect is that each of the stud members 56 and 58 is urged into firm engagement with the portion 62 of the associated retainer opening.

Although the preferred embodiment of the invention has been described above, it should be apparent that the retainer openings 24 and 26 need not be circular in configuration in order to practice the invention. They could be square holes or take the form of slots. Also, the stud members 56 and 58 could be located along inclined axes rather than along the perpendicular axes as shown in the drawing; the important consideration being that a portion of the base member adjacent each retainer opening be engageable by one side of the frusto-conical sections when the stud members 56 and 58 are being inserted within the retainer openings so as to provide the ratcheting heretofore described.

It should be apparent that various changes and modifications can be made in the construction of this fastening system without departing from the spirit of the invention. Such changes and modifications are contemplated by the inventors and they do not wish to be limited except by the scope of the appended claims.

The embodiments of the invention in which an exclusive property or privilege is claimed are defined as follows:

1. In combination with a support panel secured to a frame member having a pair of spaced retainer openings formed in the support panel, a lamp assembly including a base, first and a second cantilevered members formed with said base member, each of said cantilevered members being connected to said base member by a resilient hinge, first and second stud members respectively mounted on said first and second cantilevered members and adapted to be received by said pair of retainer openings for connecting said lamp assembly to said support panels, each of said stud members formed with a plurality of ratchet teeth along its length, each of said first and second stud members being located in a position on the respective first and second cantilevered members so that, during insertion of said first and second stud members into said first and second retainer members, said ratchet teeth engage the support panel at one side of each of said pair of retainer openings to cause said cantilevered members to pivot away from said portion about said resilient hinge to permit said stud members to be ratcheted into said pair of retainer openings and lock said lamp assembly to said support panel.

2. In combination with a support panel secured to a frame member having a pair of spaced retainer openings formed in the support panel, a lamp assembly having a base member, first and a second cantilevered members integrally formed with said base member, each of said cantilevered members being connected to said base member by a resilient hinge for pivotal movement out of the plane of said base member, first and second stud members respectively mounted on said first and second cantilevered members and adapted to be received by said pair of retainer openings for securing said lamp assembly to said support panel, each of said stud members formed with a plurality of frusto-conical sections along its length so as to present a saw-tooth profile when viewed in elevation, each of said first and second stud members being located in a position on the respective first and second cantilevered members so that a tapered side of each of the frusto-conical sections of said cantilevered members engages a portion of the support panel at said pair of retainer openings when said stud members are being inserted into said pair of retainer openings causing said cantilevered members to pivot away from said portion about said resilient hinge to permit said stud members to be ratcheted into said pair of retainer openings to lock said lamp assembly to said support panel.

3. In combination with a support panel secured to a frame member having a pair of spaced circular retainer openings formed in the support panel, a lamp assembly including a lens member having a peripheral edge, a base member forming a part of said lamp assembly and being located within the peripheral edge of said lens member, first and second cantilevered tab members being formed with said base member, each of said cantilevered tab members being connected to said base member by a resilient hinge, first and second stud members respectively mounted on said first and second cantilevered tab members and adapted to be received by said pair of retainer openings for securing said lamp assembly to said support panel, each of said stud members made of a metallic material and formed with a plurality of identical frusto-conical sections along its length so as to present a saw-tooth profile when viewed in elevation, each of said first and second stud members being located in a position on the respective first and second cantilevered members so that a tapered side of each of the frusto-conical sections of said cantilevered tab members engages a portion of the support panel adjacent said pair of retainer openings when said stud members are being inserted into said pair of retainer openings causing said cantilevered tab members to pivot away from said portion about said resilient hinge to permit said stud members to be ratcheted into said pair of retainer openings to lock said lamp assembly to said support panel.

4. The combination of claim 3 wherein said base member is planar in configuration and a longitudinal center axis of each of said stud members is substantially perpendicular to said base.

5. The combination of claim 4 wherein a horizontal distance between centers of said pair of retainer openings is greater than a horizontal distance between the longitudinal center axes of said pair of stud members.

6. The combination of claim 5 wherein said cantilevered tab members pivot into the lamp assembly towards the lens member during insertion of said stud members into said retainer openings.

7. The combination of claim 6 wherein each of said cantilevered tab members is formed by a U-shaped slot located in the base member.

\* \* \* \* \*